US007294595B2

(12) United States Patent
Iwahashi et al.

(10) Patent No.: US 7,294,595 B2
(45) Date of Patent: Nov. 13, 2007

(54) SILICA GLASS

(75) Inventors: Yasutomi Iwahashi, Yokohama (JP); Akio Koike, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/435,887

(22) Filed: May 18, 2006

(65) Prior Publication Data

US 2006/0276323 A1 Dec. 7, 2006

Related U.S. Application Data

(63) Continuation of application No. PCT/JP2004/019834, filed on Dec. 28, 2004.

(30) Foreign Application Priority Data

Jan. 5, 2004 (JP) ............................ 2004-000389

(51) Int. Cl.

| | |
|---|---|
| ***C03C 3/06*** | (2006.01) |
| ***G01N 21/00*** | (2006.01) |
| *C03B 19/00* | (2006.01) |
| *C03B 19/14* | (2006.01) |

(52) U.S. Cl. ............................ 501/54; 501/53; 501/56; 501/57; 219/553; 250/504 R; 359/350; 422/82.05

(58) Field of Classification Search ................. 501/53, 501/54, 56, 57; 219/553; 250/504 R; 359/350; 422/82.05

See application file for complete search history.

(56) References Cited

U.S. PATENT DOCUMENTS

| | | | | |
|---|---|---|---|---|
| 6,465,272 | B1 * | 10/2002 | Davis et al. | 438/72 |
| 6,576,380 | B2 * | 6/2003 | Davis et al. | 430/5 |
| 7,053,017 | B2 * | 5/2006 | Hrdina et al. | 501/54 |
| 2002/0157421 | A1 | 10/2002 | Ackerman et al. | |
| 2002/0157451 | A1 * | 10/2002 | Brandenburger | 73/11.04 |
| 2003/0226377 | A1 * | 12/2003 | Barrett et al. | 65/17.4 |
| 2005/0245382 | A1 | 11/2005 | Iwahashi et al. | |
| 2005/0245383 | A1 | 11/2005 | Iwahashi et al. | |
| 2005/0272590 | A1 | 12/2005 | Iwahashi et al. | |

FOREIGN PATENT DOCUMENTS

| | | | |
|---|---|---|---|
| EP | 0293064 | A2 * | 11/1988 |
| GB | 1213603 | | 11/1970 |
| JP | 60176945 | A * | 9/1985 |
| JP | 05178624 | | 7/1993 |
| WO | WO 2004/089836 | | 10/2004 |

OTHER PUBLICATIONS

Patent Abstracts of Japan vol. 17, No. 591 (C-1125), Oct. 1993 (abstract of JP 05178624).
U.S. Appl. No. 11/589,875, filed Oct. 31, 2006, Koike et al.
U.S. Appl. No. 11/435,887, filed May 18, 2006, Iwahashi et al.

* cited by examiner

*Primary Examiner*—Anthony J. Green
(74) *Attorney, Agent, or Firm*—Oblon, Spivak, McClelland, Maier & Neustadt, P.C.

(57) ABSTRACT

A silica glass containing from 3 to 10 mass % of $TiO_2$, which has a coefficient of thermal expansion from 0 to 100° C., i.e. $CTE_{0\ to\ 100}$, of 0±300 ppb/° C. and an internal transmittance per mm in thickness within a wavelength region of from 200 to 700 nm, i.e. $T_{200\ to\ 700}$, of at most 80%.

20 Claims, 1 Drawing Sheet

SILICA GLASS

TECHNICAL FIELD

The present invention relates to a silica glass, particularly to a black very low thermal expansion glass useful as component material for optical analytical instruments or infrared heating apparatuses.

BACKGROUND ART

Quartz glass has a low coefficient of thermal expansion (CTE) and thus has characteristics such that it is excellent in thermal shock resistance and also excellent in chemical durability and mechanical properties. Heretofore, as a material capable of absorbing or radiating infrared light while having such characteristics of quartz glass, one so-called black colored quartz glass or black quartz glass (hereinafter generally referred to as "black quartz glass") has been available which contains a transition metal such as vanadium or niobium. In view of the infrared absorptivity and thermal shock resistance, such black quartz glass has been used as a component material of a product for high precision analysis, such as optical analytical instruments or infrared heating apparatuses.

Further, silica glass containing $TiO_2$ (hereinafter referred to as $TiO_2$—$SiO_2$ glass) is known to be a very low thermal expansion material having a coefficient of thermal expansion (CTE) smaller than quartz glass, and the coefficient of thermal expansion can be controlled by the $TiO_2$ content in the glass, whereby it is possible to obtain a zero expansion glass having a coefficient of thermal expansion being close to zero. Accordingly, if such silica glass containing $TiO_2$ being a very low thermal expansion material, has infrared absorptivity, it can be used as e.g. a cell material for optical analytical instruments or a component material of infrared heating apparatuses, which is superior in thermal shock resistance, etc., to conventional black quartz.

A conventional method for preparing $TiO_2$—$SiO_2$ glass is as follows. First, a silica precursor and a titania precursor are, respectively, converted into a vapor form, and then mixed. Such a vapor form mixture is feeded into a burner and thermally decomposed to form $TiO_2$—$SiO_2$ glass particles. Such $TiO_2$—$SiO_2$ glass particles will be deposited in a refractory container and at the same time will be melted to form $TiO_2$—$SiO_2$ glass. However, in $TiO_2$—$SiO_2$ glass prepared by this method, the temperature region where the coefficient of thermal expansion becomes substantially zero, is limited to about room temperature.

Further, U.S. Pat. Application Publication No. 2002/157421 discloses a method which comprises forming a $TiO_2$—$SiO_2$ porous glass body, converting it to a glass body, and then obtaining a mask substrate therefrom.

conventional black quartz glass has a coefficient of thermal expansion which is equal to or more than quartz glass, and thus, its thermal expansion coefficient is substantially large. Thus, black quartz glass which has been used for a conventional cell material for optical analysis or for a component material of infrared heating apparatuses, has been inadequate in thermal shock resistance, as its thermal expansion coefficient is large.

DISCLOSURE OF THE INVENTION

Embodiment 1 of the present invention provides a silica glass containing from 3 to 10 mass % of $TiO_2$, which has a coefficient of thermal expansion from 0 to 100° C. (hereinafter referred to as $CTE_{0\ to\ 100}$) of 0±300 ppb/° C. and an internal transmittance per mm in thickness within a wavelength region of from 200 to 700 nm (hereinafter referred to as $T_{200\ to\ 700}$) of at most 80%.

Embodiment 2 of the present invention provides the silica glass according to Embodiment 1, which contains a component reacting as a reducing agent for $TiO_2$.

Embodiment 3 of the present invention provides the silica glass according to Embodiment 1 or 2, which has an internal transmittance per mm in thickness within a wavelength region of from 200 to 3,000 nm, i.e. $T_{200\ to\ 3,000}$, of at most 90%.

Embodiment 4 provides the silica glass according to Embodiment 1, 2 or 3, which contains F.

According to the present invention, it is possible to obtain a black very low thermal expansion glass excellent in thermal shock resistance, chemical durability and mechanical properties. Thus, it is possible to obtain a material useful for a cell for optical analysis or useful as a component material of infrared heating apparatuses.

Figure 1:
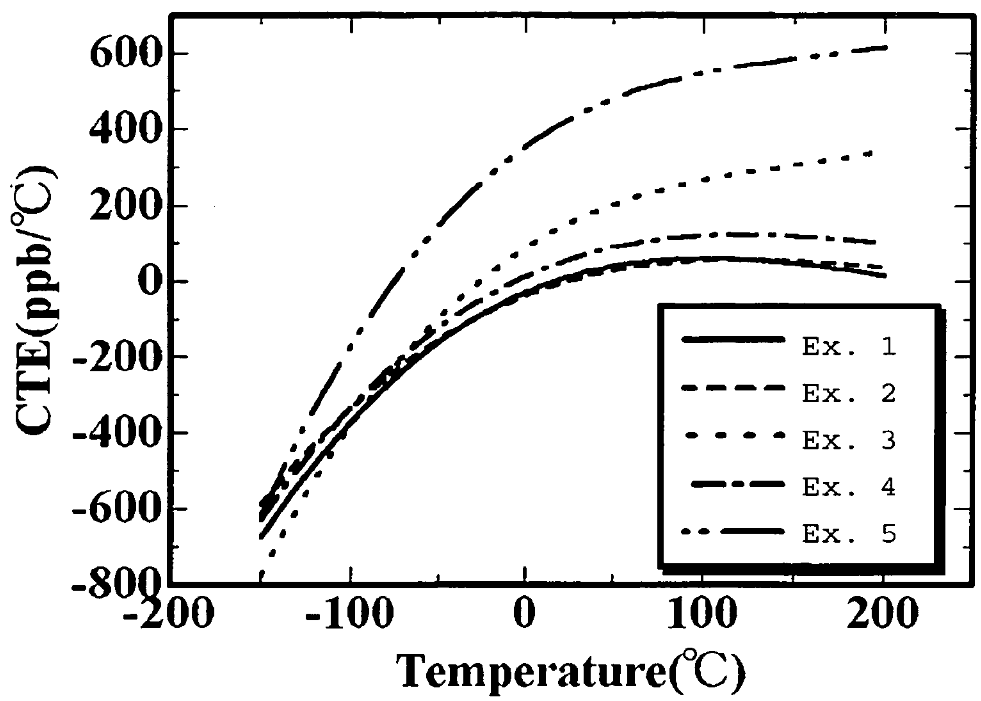
FIG. 1 is a graph showing the changes by temperature of the coefficients of thermal expansion with respect to glasses of the present invention and glasses of Comparative Examples.

BEST MODE FOR CARRYING OUT THE INVENTION $TiO_2$—$SiO_2$ glass is known to have a coefficient of thermal expansion which changes depending upon the concentration of $TiO_2$ contained, and the coefficient of thermal expansion of $TiO_2$—$SiO_2$ glass containing about 7 mass % of $TiO_2$ becomes substantially zero at near room temperature.

The $TiO_2$—$SiO_2$ glass of the present invention is preferably a silica glass containing from 3 to 10 mass % of $TiO_2$. If the content of $TiO_2$ is less than 3%, zero expansion may not be accomplished, and if it exceeds 10 mass %, the coefficient of thermal expansion is likely to be negative. The content of $TiO_2$ is more preferably from 5 to 9 mass %.

The $TiO_2$—$SiO_2$ glass of the present invention has chemical durability and mechanical properties substantially equal to quartz glass and thus is excellent in chemical durability and mechanical properties.

Further, in the present invention, at least one metal component selected from Zr, V, Nb, Cr, Mo, Mn, Fe, Cu and Ce may be incorporated in a range not to impair the properties such as the coefficient of thermal expansion. Such a metal component is effective for blackening. However, if its content is large, the glass properties may deteriorate, such that the coefficient of thermal expansion may increase or devitrification may take place.

With the $TiO_2$—$SiO_2$ glass of the present invention, the internal transmittance per mm in thickness within a wavelength region of from 200 to 700 nm, is at most 80%. If it exceeds 80%, visible light tends to be hardly absorbed. It is preferably at most 50%, more preferably at most 30%, particularly preferably at most 20%.

In the present invention, the internal transmittance per mm in thickness within a wavelength region of from 200 to 1,500 nm (hereinafter referred to as $T_{200\ to\ 1,500}$), is preferably at most 90%. It is more preferably at most 50%, particularly preferably at most 20%.

In the present invention, the internal transmittance per mm in thickness within a wavelength region of from 200 to 3,000 nm, is preferably at most 80%. If it exceeds 80%, absorption of light in a near infrared region tends to be inadequate, whereby it tends to be difficult to shield near infrared light. Accordingly, it tends to be difficult to use such glass as a component material for an analytical instrument. It is more preferably at most 50%, particularly preferably at most 20%.

The transmittance will be measured as an internal transmittance of mirror-polished glass of 1 mm in thickness by means of a spectrophotometer (U-3500, manufactured by Hitachi, Ltd.), as follows. The calculation of the internal transmittance is as follows. First, the transmittances of similarly mirror-polished samples having different thicknesses, e.g. samples of 2 mm and 1 mm in thickness, are measured. And, the respective transmittances are converted to absorbances, then the absorbance of the sample of 1 mm in thickness is subtracted from the absorbance of the sample of 2 mm in thickness to obtain the absorbance per mm. The obtained absorbance is again converted to a transmittance, which will be taken as the internal transmittance per mm in thickness.

In order to simplify the process, the internal transmittance may otherwise be calculated by using the following method. A decrease in the transmittance of similarly mirror-polished quartz glass of about 1 mm in thickness, at a wavelength where quartz glass shows no absorption, e.g. at a wavelength around 2,000 nm, is regarded as a reflection loss at the front and rear surfaces. The decrease in the transmittance is converted to an absorbance which is taken as the reflection loss at the front and rear surfaces. The transmittance of the sample of 1 mm in thickness in the wavelength region, is converted to an absorbance, then, the absorbance around 2,000 nm of the quartz glass of about 1 mm in thickness, is subtracted from the obtained absorbance. The difference in absorbance is again converted to a transmittance to obtain the internal transmittance.

In the present invention, $CTE_{0\ to\ 100}$ is 0±300 ppb/° C. If the absolute value of the coefficient of thermal expansion exceeds 300 ppb/° C., the dimensional change due to a temperature change tends to be large, whereby in the case of a component material for infrared heating apparatuses, the coefficient of thermal expansion or shrinkage may not be neglected. It is preferably 0±200 ppb/° C.

Especially in the case of a component required to have a very low coefficient of thermal expansion, $CTE_{0\ to\ 100}$ is preferably 0±150 ppb/° C., more preferably 0±100 ppb/° C. Correspondingly, the coefficient of thermal expansion from −50 to 150° C. (hereinafter referred to as $CTE_{-50\ to\ 150}$) is preferably 0±450 ppb/° C., more preferably 0±350 ppb/° C. Especially in the case of a component required to have a very low coefficient of thermal expansion, $CTE_{-50\ to\ 150}$ is preferably 0±200 ppb/° C.

Further, in the case of a component required to have a coefficient of thermal expansion at room temperature to be as close as possible to 0, like a component of an apparatus to be used near the room temperature, the average coefficient of thermal expansion of glass at 22.0° C. (hereinafter referred to as $CTE_{22}$) is preferably 0±30 ppb/° C., more preferably 0±20 ppb/° C., further preferably 0±10 ppb/° C., particularly preferably 0±5 ppb/° C.

Further, by incorporating F in the glass of the present invention having a coefficient of thermal expansion close to 0, the temperature range in which the coefficient of the thermal expansion becomes 0±5 ppb/° C. can be increased. Especially in the case of a component required to have a very low coefficient of thermal expansion, the temperature range within which the coefficient of thermal expansion becomes 0±5 ppb/° C. is preferably at least 3.0° C., more preferably at least 4.5° C. In a case where it is desired to increase the temperature range within which the coefficient of the thermal expansion becomes 0±5 ppb/° C., it is preferably at least 5.0° C., particularly preferably at least 6.0° C.

The coefficient of thermal expansion is measured, for example, by means of a laser interference thermal expansion meter (laser thermal expansion meter LIX-1, manufactured by ULVAC) within a range of from −150 to +200° C. In order to increase the precision for measuring the coefficient of thermal expansion, it is effective to employ a method of repeating the measurement in a plurality of times and averaging the coefficients of thermal expansion. The temperature range within which the coefficient of thermal expansion becomes 0±5 ppb/° C. is led by calculating the temperature range within which the coefficient of thermal expansion becomes from −5 to 5 ppb/° C. from the thermal expansion coefficient curve obtained by the measurements.

In the present invention, the fictive temperature is preferably at most 1,200° C. The present inventors have found that the fictive temperature and the extent of the temperature range for zero expansion are related. Namely, if the fictive temperature exceeds 1,200° C., the temperature range for zero expansion tends to be narrow, and the temperature range for zero expansion tends to be inadequate particularly for a component which is required to have a very low coefficient of thermal expansion. The fictive temperature is more preferably at most 1,100° C., particularly preferably at most 1,000° C.

In order to obtain the fictive temperature in the present invention, for example, a method is effective wherein the glass material is held at a temperature of from 600 to 1,200° C. for at least 5 hours and then cooled to 500° C. or lower at an average cooling rate of at most 10° C./hr.

The fictive temperature is measured as follows. Mirror-polished glass is immersed in an aqueous solution of 10% HF-2.5% $H_2SO_4$ to remove scratch marks or abrasive grains remaining on the surface. The reflection spectrum of the surface is obtained by means of an infrared spectrometer (Magna 760, manufactured by Nikolet Company). At that time, the infrared incident angle is set to be 6.5° and the data taking interval is set to be about 0.5 $cm^{-1}$, and an average value of data obtained by scanning 64 times, is employed. In the infrared reflection spectrum thus obtained, the maximum peak observed at about 1,120 $cm^{-1}$ is due to stretching vibration of the Si—O—Si bond of $TiO_2$—$SiO_2$ glass. The fictive temperature is obtained from this peak position by using a calibration curve which is prepared by a sample having a known fictive temperature. Otherwise, the absorption spectrum is obtained in a similar manner, and in the infrared absorption spectrum obtained, the peak position observed at about 2,260 $cm^{-1}$ corresponding to the overtone mode of the stretching vibration of the Si—O—Si bond of $TiO_2$—$SiO_2$ glass, is used to obtain the fictive temperature by using a calibration curve which is prepared by a sample having a known fictive temperature.

In the present invention, F is at least 100 ppm, preferably at least 200 ppm, more preferably at least 500 ppm, particularly preferably at least 2,000 ppm, most preferably at least 5,000 ppm.

It has been known that the F concentration has some effects on the structural relaxation of glass (Journal of Applied Physics 91 (8), 4886 (2002)). According to this report, the structural relaxation time is accelerated by F, whereby it becomes easy to realize a glass structure having a low fictive temperature (first effect). Accordingly, incorporation of a large amount of F in $TiO_2$—$SiO_2$ glass is effective to lower the fictive temperature and to broaden the temperature range for zero expansion.

In addition, as a result of the comparison between normal $TiO_2$—$SiO_2$ glass and F-doped $TiO_2$—$SiO_2$ having substantially equal fictive temperatures, the present inventors have found that the glass containing F has a smaller temperature change of $CTE_{-50\ to\ 150}$ than that not containing F.

Thus, incorporation of F is considered to be effective to broadening the temperature range for zero expansion in addition to lowering the fictive temperature (second effect).

The component reacting as a reducing agent for $TiO_2$ is meant for a substance which is capable of converting $Ti^{4+}$ to $Ti^{3+}$ or Ti ions having a lower valency. It is preferably a substance containing a halogen, H or C, more preferably a substance containing F as the halogen.

The following several processes are available as processes for producing $TiO_2$—$SiO_2$ glass containing F. One is a soot process. By the soot process, $TiO_2$—$SiO_2$ glass particles (soot) obtained by flame hydrolysis or thermal decomposition of a Si precursor and a Ti precursor as glass-forming materials, are deposited and grown to obtain a porous $TiO_2$—$SiO_2$ glass body. The obtained porous $TiO_2$—$SiO_2$ glass body is treated with a F-containing atmosphere. Then, it is heated to a temperature of at least the vitrification temperature to obtain a $TiO_2$—$SiO_2$ glass body having F incorporated. As such a soot process, for example, a MCVD process, an OVD process and a VAD process are available.

In this specification, the vitrification temperature is meant for a temperature at which a porous glass body can be densified to such an extent that no voids can be ascertained by an optical microscope.

The soot process includes a process wherein ones containing F are used as the Si precursor and the Ti precursor being the glass-forming materials, or flame hydrolysis or thermal decomposition of the Si precursor and the Ti precursor in a F-containing atmosphere to obtain a porous $TiO_2$—$SiO_2$ glass body containing F, which is vitrified to obtain a $TiO_2$—$SiO_2$ glass body containing F.

As another process for producing $TiO_2$—$SiO_2$ glass containing F, a process by so-called the direct method is applicable. In the direct method for producing $TiO_2$—$SiO_2$ glass containing F, the Si precursor containing F and/or the Ti precursor containing F are used as glass-forming materials, or the Si precursor and the Ti precursor are hydrolyzed/oxidized in oxygen hydrogen flame at a temperature of from 1,800 to 2,000° C. in a F-containing atmosphere.

The method for measuring the F concentration is as follows. The $TiO_2$—$SiO_2$ glass is heated and fused by anhydrous sodium carbonate, and to the obtained fused liquid, distilled water and hydrochloric acid are added each in a volume ratio of 1 to the fused liquid, to obtain a sample liquid. The electromotive force of the sample liquid is measured by a radiometer by using a fluorine ion selective electrode and, as a comparative electrode, No. 945-220 and No. 945-468 manufactured by Radiometer Trading Company, respectively, and the fluorine content is obtained based on a calibration curve preliminarily prepared by using a fluorine ion standard solution (Journal of Japanese Chemical Society, 1972 (2), 350). Here, the detection limit by this method is 10 ppm.

An example of the process for producing the glass of the present invention will be described below.

Step (a)

$TiO_2$—$SiO_2$ glass particles obtained by flame hydrolysis of a Si precursor and a Ti precursor as glass-forming materials, are deposited and grown on a target to form a porous $TiO_2$—$SiO_2$ glass body. The glass-forming materials are not particularly limited so long as they are materials capable of being gasified. However, the Si precursor may, for example, be a silicon halide compound, such as a chloride such as $SiCl_4$, $SiHCl_3$, $SiH_2Cl_2$ or $SiH_3Cl$, a fluoride such as $SiF_4$, $SiHF_3$ or $SiH_2F_2$, a bromide such as $SiBr_4$ or $SiHBr_3$ or an iodide such as $SiI_4$, or an alkoxy silane represented by $R_nSi(OR)_{4-n}$ (wherein R is a $C_{1-4}$ alkyl group, and n is an integer of from 0 to 3), and the Ti precursor may, for example, be a titanium halide compound such as $TiCl_4$ or $TiBr_4$, or a titanium alkoxide represented by $R_nSi(OR)_{4-n}$ (wherein R is a $C_{1-4}$ alkyl group, and n is an integer of from 0 to 3). Further, as the Si precursor and the Ti precursor, a compound of Si and Ti, such as a silicon-titanium alkoxide, may also be used.

As the target, a quartz glass target (such as a target as disclosed in JP-B-63-24973) may be used. It may not be limited to a rod shape, and a plate-shaped target may be employed.

Step (b)

The porous $TiO_2$—$SiO_2$ glass body obtained in step (a) is held in a fluorine-containing atmosphere to obtain a porous $TiO_2$—$SiO_2$ glass body containing fluorine. As such a fluorine-containing atmosphere, a gas atmosphere containing from 0.1 to 100 vol % of a fluorine-containing gas (such as $SiF_4$, $SF_6$, $CHF_3$, $CF_4$, $C_2F_6$, $C_3F_8$ or $F_2$) is preferred. The treatment in such an atmosphere under a pressure of from 10,000 to 133,000 Pa for from a few tens minutes to a few hours, is preferably carried out at room temperature or at a high temperature of not higher than the vitrification temperature. If it is desired to lower the treating temperature to obtain the same fluorine-doping amount, the treating time may be prolonged so that the glass body is held for from 5 to a few tens hours.

If a temperature exceeding the vitrification temperature is employed, densification will proceed in the porous $TiO_2$—$SiO_2$ glass body, whereby it tends to be difficult to incorporate fluorine to the interior of the porous $TiO_2$—$SiO_2$ glass body, such being undesirable.

For example, in a case where $SiF_4$ is used as the fluorine-containing atmosphere, the treating temperature and treating time may be set as follows depending upon the amount of fluorine to be doped in the porous $TiO_2$—$SiO_2$ glass body.

In a case where it is desired to bring the fluorine doping amount to be less than 1,000 ppm, the glass body may be held in a gas atmosphere containing from 1 to 10 vol % of $SiF_4$ for from 2 to a few tens hours at room temperature. In a case where it is desired to bring the fluorine doping amount to be from 1,000 to 5,000 ppm, the glass body may be held in a gas atmosphere containing from 2 to 10 vol % of $SiF_4$ for from 2 to a few tens hours at a temperature of from 500 to 1,000° C. In a case where it is desired to bring the fluorine doping amount to be from 5,000 ppm to 10,000 ppm, the glass body may be held in a gas atmosphere containing from 5 to a few tens vol % of $SiF_4$ for from 2 to a few tens hours at a temperature of from 1,000 to 1,300° C.

Further, in step (b), it is preferred to hold the porous $TiO_2$—$SiO_2$ glass body under a reduced pressure of preferably at most 13,000 Pa, particularly preferably at most 1,300 Pa, and then introduce a fluorine-containing gas to normal pressure to obtain a fluorine-containing atmosphere.

Further, in a case where no F is incorporated, instead of step (b), the following step (b') may be adopted.

Step (b')

The porous $TiO_2$—$SiO_2$ glass body obtained in step (a) is treated in an inert atmosphere or in a reducing atmosphere containing hydrogen, carbon, etc., under a pressure of from 10,000 to 133,000 Pa for from a few tens minutes to a few hours at a high temperature of not higher than the vitrification temperature, to obtain a heated porous $TiO_2$—$SiO_2$ glass body. For example, the porous $TiO_2$—$SiO_2$ glass body is heated in an inert atmosphere together with a carbon mold or a carbon crucible, or the porous $TiO_2$—$SiO_2$ glass body is heated in an inert atmosphere by means of a carbon electric resistance furnace, which substantially corresponds to heat treatment in a reducing atmosphere containing carbon, etc.

In this specification, "Pa" is meant for the absolute pressure i.e. not a gauge pressure.

Step (c)

The porous $TiO_2$—$SiO_2$ glass body obtained in step (b) or (b'), is heated to the vitrification temperature to obtain a $TiO_2$—$SiO_2$ glass body not substantially containing a crystal component. Here, "not substantially containing a crystal component" means that in the powdery X-ray diffraction, no distinct peak corresponding to the crystal is observed. The vitrification temperature is usually from 1,250 to 1,700° C., particularly preferably from 1,300 to 1,650° C. If the content of F is large, the viscosity of glass tends to decrease, and the vitrification temperature tends to decrease, and therefore, it is preferably from 1,250 to 1,550° C., particularly preferably from 1,300 to 1,500° C.

The atmosphere is preferably an atmosphere composed of 100% an inert gas such as helium, or an atmosphere containing an inert gas such as helium as the main component. The pressure may be reduced pressure or atmospheric pressure. In the case of atmospheric pressure, a helium gas may be employed. In the case of reduced pressure, it is preferably at most 13,000 Pa.

Further, in a case where heat treatment is carried out in a reducing atmosphere containing helium as the main component and containing carbon or the like, it is possible to obtain a $TiO_2$—$SiO_2$ glass body not substantially containing a crystal component, by heating the porous $TiO_2$—$SiO_2$ glass body obtained in step (a) to the vitrification temperature. Therefore, by carrying out step (c) in such a reducing atmosphere containing helium as the main component, it is possible to omit step (b') (step (c')).

The transmittance of glass is controlled by the heat treatment method. Specifically, it is controlled by the temperature and the atmosphere of step (b), (b') or (c). When the atmosphere contains a larger amount of F or Ti or when the atmosphere tends to be on a more reducing side, blackening of glass tends to increase, and the transmittance tends to decrease. As mentioned above, in a case where the transmittance is lowered by incorporating at least one metal selected from Zr, V, Nb, Cr, Mo, Mn, Fe, Cu and Ce, if the content of such a metal is large, the coefficient of thermal expansion tends to be large, such being undesirable as a component material for optical analytical instruments or infrared heating apparatuses. However, when F or Ti is incorporated, F or Ti has an effect to reduce the coefficient of thermal expansion, and the metal content may be increased, such being desirable for a component material for optical analytical instruments or infrared heating apparatuses. Specifically, when $TiO_2$ is incorporated in an amount of about 7 mass %, the coefficient of thermal expansion of the $TiO_2$—$SiO_2$ glass will be substantially zero near the room temperature, and when F is incorporated, the temperature range of zero expansion can be broadened.

The following process may be employed for forming the glass of the present invention.

Step (d)

The $TiO_2$—$SiO_2$ glass body obtained in step (c) or (c') is heated to a temperature above near the softening temperature and formed into a desired shape to obtain a formed glass body. The temperature for forming is preferably from 1,500 to 1,800° C. If it is lower than 1,500° C., no substantial deadweight transformation takes place, since the viscosity of the $TiO_2$—$SiO_2$ glass containing F is high, and growth of cristobalite being a crystalline phase of $SiO_2$ or growth of rutile or anatase being a crystalline phase of $TiO_2$ takes place, thus leading to so-called devitrification. If the temperature exceeds 1,800° C., vaporization of $SiO_2$ tends to be not negligible.

The following process may be employed to control the annealing or fictive temperature of the glass of the present invention.

Step (e)

The $TiO_2$—$SiO_2$ glass body obtained in step (c) or (c'), or the formed glass body obtained in step (d), is held at a temperature of from 600 to 1,200° C., for at least 5 hours. Then, the temperature is lowered to not higher than 500° C. at an average cooling rate of at most 10° C./hr to carry out annealing treatment thereby to control the fictive temperature of the glass. Otherwise, the fictive temperature of the $TiO_2$—$SiO_2$ glass is controlled by carrying out annealing treatment wherein the formed $TiO_2$—$SiO_2$ glass body obtained in step (d) at a temperature of at least 1,200° C. is cooled to 500° C. at an average cooling rate of at most 10° C./hr. After the temperature is lowered to not higher than 500° C., the glass body may be cooled. The atmosphere in such a case is preferably an atmosphere of 100% inert gas such as helium, argon or nitrogen or an atmosphere containing such an inert gas as the main component, or an atmosphere of air, and the pressure is preferably a reduced pressure or a normal pressure.

The glass of the present invention obtained by the above process is suitable for a cell material for optical analysis or for a component material of infrared heating apparatuses. Further, the glass of the present invention is useful also as a base material for an optical material for an exposure device to be used for EUV lithography (hereinafter referred to as EUVL) because of its very low thermal expansion property. In the present invention, EUV (Extreme Ultra Violet) light means light having a wave band in a soft X-ray region or in a vacuum ultraviolet region and specifically means light having a wavelength of from about 0.2 to 100 nm.

The optical material for an exposure device to be used for EUVL is basically constituted by (1) a base material, (2) a reflective multilayer formed on the base material and (3) an absorber layer formed on the reflective multilayer. As the base material, a material having a very low thermal expansion coefficient is required so that no strain will be formed even under irradiation with EUV light. Further, also from the viewpoint of the homogeneity and the surface smoothness, glass having a very low thermal expansion coefficient is being studied.

The optical material for an exposure device to be used for EUVL is of a reflection type, and transmittance is not required. Thus, black quartz glass is considered to be a candidate for the base material. However, conventional black quartz glass has a coefficient of thermal expansion which is equal to or higher than the quartz glass, and as such, it was not suitable as the base material. As compared with conventional $TiO_2$—$SiO_2$ glass and black quartz glass, the glass of the present invention has a wide temperature range within which the coefficient of thermal expansion becomes substantially zero, and thus, it is suitable for the optical material for an exposure device for EUVL.

Now, the present invention will be described in further detail with reference to Examples. However, it should be understood that the present invention is by no means restricted to such specific Examples. In the following Examples, the size of each sample used for measurements was as small as, for example, 20 mm×20 mm with a thickness of 2 mm, and therefore, even if it was rapidly cooled at the time of annealing treatment in step (e), there was no substantial temperature distribution in the sample. Therefore, for the annealing treatment, a method of rapidly cooling was adopted without adopting the method of cooling to 500° C. at an average cooling rate of at most 10° C./hr.

EXAMPLE 1

$TiO_2$—$SiO_2$ glass particles obtained by gasifying $TiCl_4$ and $SiCl_4$ as glass-forming materials for $TiO_2$—$SiO_2$ glass, respectively, then mixing them and feeding them to heat hydrolysis (flame hydrolysis) in oxyhydrogen flame, were deposited and grown on a target to form a porous $TiO_2$—$SiO_2$ glass body having a diameter of 80 cm and a length of about 100 cm (step (a)).

The obtained porous $TiO_2$—$SiO_2$ glass body was difficult to handle by itself, and therefore, as it was deposited on the target, it was held at 1,200° C. in the air for 4 hours and then removed from the target.

Then, the porous $TiO_2$—$SiO_2$ glass body was set in an electric furnace capable of controlling the atmosphere, and after reducing the pressure to 1,330 Pa at room temperature, returned to atmospheric pressure by a mixed gas of He/$SiF_4$=90/10 (volume ratio) and held at room temperature for two hours under the He/$SiF_4$=90/10 (volume ratio) gas atmosphere (step (b)).

Then, it was heated to 1,570° C. in an atmosphere of 100% He and then held at this temperature for 4 hours to obtain a $TiO_2$—$SiO_2$ glass body containing fluorine (step (c)).

The obtained glass was held at 800° C. for 100 hours and then rapidly cooled to control the fictive temperature (step (e)).

EXAMPLE 2

$TiO_2$—$SiO_2$ glass particles obtained by gasifying $TiCl_4$ and $SiCl_4$ as glass-forming materials for $TiO_2$—$SiO_2$ glass, respectively, then mixing them and feeding them to heat hydrolysis (flame hydrolysis) in oxyhydrogen flame, were deposited and grown on a target to form a porous $TiO_2$—$SiO_2$ glass body having a diameter of 80 cm and a length of about 100 cm (step (a)).

The obtained porous $TiO_2$—$SiO_2$ glass body was difficult to handle by itself, and therefore, as it was deposited on the target, it was held at 1,200° C. in the air for 4 hours and then removed from the target.

Then, the porous $TiO_2$—$SiO_2$ glass body was set in an electric furnace capable of controlling the atmosphere, and after reducing the pressure to 1,330 Pa at room temperature, returned to atmospheric pressure by a mixed gas of $O_2$/$SiF_4$=90/10 (volume ratio) and heated at 1,000° C. for four hours under the $O_2$/$SiF_4$=90/10 (volume ratio) gas atmosphere (step (b)).

Then, it was heated to 1,540° C. in an atmosphere of 100% He and then held at this temperature for 3 hours to obtain a $TiO_2$—$SiO_2$ glass body containing fluorine (step (c)).

The obtained glass was held at 800° C. for 100 hours and then rapidly cooled to control the fictive temperature (step (e)).

EXAMPLE 3

$TiO_2$—$SiO_2$ glass particles obtained by gasifying $TiCl_4$ and $SiCl_4$ as glass-forming materials for $TiO_2$—$SiO_2$ glass, respectively, then mixing them and feeding them to heat hydrolysis (flame hydrolysis) in oxyhydrogen flame, were deposited and grown on a target to form a porous $TiO_2$—$SiO_2$ glass body having a diameter of 80 cm and a length of about 100 cm (step (a)).

The obtained porous $TiO_2$—$SiO_2$ glass body was difficult to handle by itself, and therefore, as it was deposited on the target, it was held at 1,200° C. in the air for 4 hours and then removed from the target.

Then, the porous $TiO_2$—$SiO_2$ glass body was set in a carbon electric resistance furnace, and after reducing the pressure to 1,330 Pa at room temperature, heated to 1,400° C. and held at this temperature for 4 hours. Further, it was continuously heated to 1,570° C. in an atmosphere of 100% He and then, held at this temperature for 4 hours to obtain a $TiO_2$—$SiO_2$ glass body (step (c')).

The obtained glass was held at 800° C. for 10 hours and then rapidly cooled to control the fictive temperature (step (e)).

EXAMPLE 4

ULE #7972 manufactured by Corning Inc. known as zero expansion $TiO_2$—$SiO_2$ glass, was used. The composition was such that $SiO_2$ was 92.6 mass %, $TiO_2$ was 7.4 mass %, and no F was contained. Further, no heat treatment in a reducing atmosphere was applied. With respect to the composition in Example 4, as a result of the qualitative analysis carried out by means of fluorescent X-ray, no component other than $SiO_2$ and $TiO_2$ was found to be contained. Accordingly, the concentration of $TiO_2$ was obtained by an ICP emission spectrometry.

EXAMPLE 5

Commercially available conventional black quartz glass was used. The composition was such that $SiO_2$ was 98.8 mass %, $Nb_2O_5$ was 1.1 mass %, $Al_2O_3$ was 0.04 mass %, $Fe_2O_3$ was 0.02 mass %, $P_2O_5$ was 0.02 mass %, and no $TiO_2$ or no F was contained. The composition in Example 5 was determined by a non-standard FP quantitative method by using fluorescent X-ray.

Figure 2:
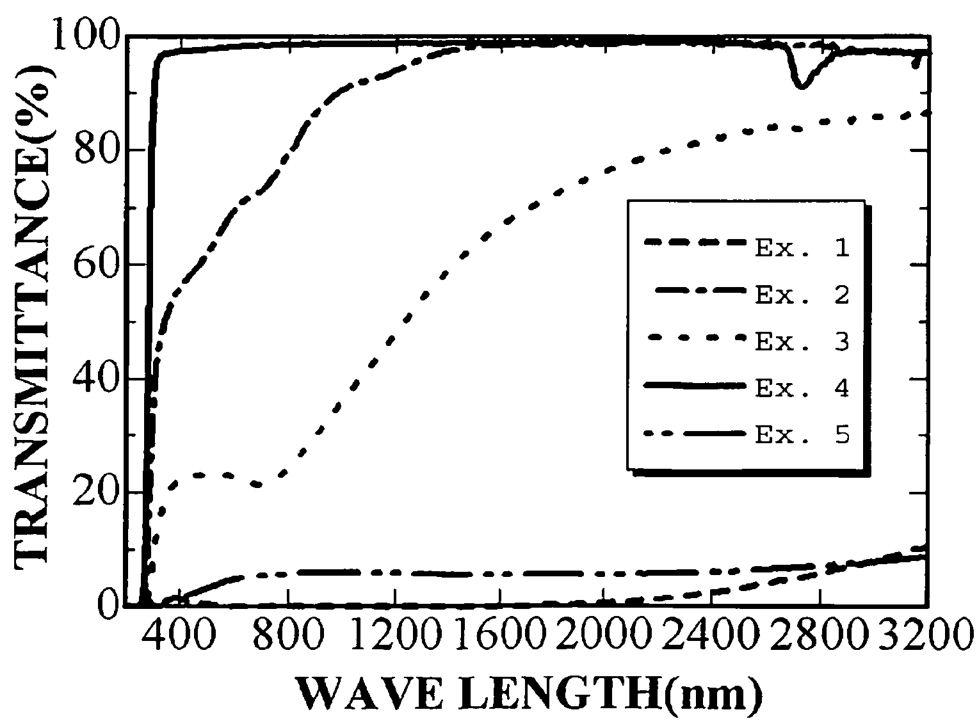
FIG. 2 is a graph showing the internal transmittances (from 200 to 3,200 nm) per mm in thickness of glasses of the present invention and glasses of Comparative Examples.

The temperature dependences of the thermal expansion coefficients of glasses prepared in the above Examples 1 to 3 are shown in FIG. 1, and the internal transmittances within a wavelength region of from 200 to 3,200 nm per mm in thickness are shown in FIG. 2. The results of measurements of the respective physical properties are summarized in Tables 1 and 2. Further, with respect to the evaluation methods, the respective evaluations were carried out in accordance with the above-described measuring methods. Further, the temperature width for thermal expansion coefficient being 0±5 ppb/° C. in Table 2 was led by calculating the temperature range within which the coefficient of thermal expansion becomes from −5 to 5 ppb/° C. from the curve in FIG. 2. Here, Examples 1 to 3 are Examples of the present invention, and Examples 4 and 5 are Comparative Examples.

TABLE 1

| | $TiO_2$ concentration (mass %) | F concentration (ppm) | $T_{200\ to\ 700}$ (%) | $T_{200\ to\ 1,500}$ (%) | $T_{200\ to\ 3,000}$ (%) | $CTE_{0\ to\ 150}$ (ppb/° C.) Minimum value to maximum value |
|---|---|---|---|---|---|---|
| Ex. 1 | 7.4 | 500 | ≦1.5 | ≦1.5 | ≦10.6 | −30 to 60 |
| Ex. 2 | 7.3 | 6,000 | ≦23.2 | ≦63.4 | ≦86.9 | −40 to 55 |
| Ex. 3 | 7.3 | — | ≦73.2 | ≦98.1 | ≦99.9 | 90 to 270 |
| Ex. 4 | 7.4 | — | ≦98.5 | ≦99.4 | ≦99.9 | 30 to 145 |
| Ex. 5 | — | — | ≦5.4 | ≦6.1 | ≦8.8 | 350 to 550 |

TABLE 2

| | $CTE_{-50\ to\ 150}$ (ppb/° C.) Minimum value to maximum value | $CTE_{22}$ (ppb/° C.) | Temperature width (° C.) for thermal expansion coefficient being 0 ± 5 ppb/° C. |
|---|---|---|---|
| Ex. 1 | −160 to 60 | 5 | 6.4 |
| Ex. 2 | −155 to 55 | 2 | 7.5 |
| Ex. 3 | −95 to 310 | 145 | 2.8 |
| Ex. 4 | −110 to 145 | 50 | 4.2 |
| Ex. 5 | 145 to 585 | 420 | — |

Example 1 represents $TiO_2$—$SiO_2$ glass containing F. Thus, each of $T_{200\ to\ 700}$, $T_{200\ to\ 1,500}$ and $T_{200\ to\ 3,000}$ was not higher than 20%, and with respect to the coefficient of thermal expansion, $CTE_{0\ to\ 100}$ was within a range of 0±100 ppb/° C. Further, $CTE_{-50\ to\ 150}$ was also within a range of 0±200 ppb/° C., and the temperature range within which the coefficient of the thermal expansion became from −5 to 5 ppb/° C. was more than 6.0° C.

Example 2 represents $TiO_2$—$SiO_2$ glass containing F, but heat treatment was carried out in an atmosphere containing oxygen. Therefore, Example 2 was inferior to Example 1 in the absorbance, but $T_{200\ to\ 700}$ was not higher than 30%, $T_{200\ to\ 1,500}$ was not higher than 80%, and $T_{200}$ to 3,000 was not higher than 90%.

With respect to the coefficient of thermal expansion in Example 2, $CTE_{0\ to\ 100}$ was within a range of 0±100 ppb/° C., and $CTE_{-50\ to\ 150}$ was within a range of 0±200 ppb/° C. As compared in Example 1, in Example 2, F is contained in a large amount, whereby the temperature range within which the coefficient of thermal expansion became from −5 to 5 ppb/° C., was 7.5, thus also showing an excellent characteristics.

Example 3 represents $TiO_2$—$SiO_2$ glass, but no F was contained. Therefore, as compared with Examples 1 and 2, Example 3 was inferior in both absorbance and low thermal expansion property. However, in Example 3, heat treatment in a reducing atmosphere was applied, whereby $T_{200\ to\ 700}$ was not higher than 80%, and with respect to the coefficient of thermal expansion, $CTE_{0\ to\ 100}$ was within a range of 0±300 ppb/° C., and $CTE_{-50\ to\ 150}$ was within a range is of 0±350 ppb/° C.

Example 4 represents $TiO_2$—$SiO_2$ glass, but no F was contained, and no heat treatment in a reducing atmosphere was applied. Therefore, Example 4 was inferior in the absorbance.

Example 5 represents black quartz glass, but no $TiO_2$ or no F was contained. Therefore, Example 5 was inferior in the low thermal expansion property.

The entire disclosure of Japanese Patent Application No. 2004-000389 filed on Jan. 5, 2004 including specification, claims, drawings and summary is incorporated herein by reference in its entirety.

What is claimed is:

1. A silica glass comprising from 3 to 10 mass % of $TiO_2$, wherein the silica glass has a coefficient of thermal expansion from 0 to 100° C. of 0±300 ppb/°C., and an internal transmittance per mm in thickness within a wavelength region of from 200 to 700 nm of at most 80%.

2. The silica glass according to claim 1, comprising a reducing agent for $TiO_2$ wherein the reducing agent is a halogen or carbon.

3. The silica glass according to claim 1, which has an internal transmittance per mm in thickness within a wavelength region of from 200 to 3,000 nm of at most 90%.

4. The silica glass according to claim 1, further comprising F.

5. The silica glass according to claim 1, wherein the internal transmittance per mm in thickness within a wavelength region of from 200 to 700 nm is at most 50%.

6. The silica glass according to claim 5, wherein the internal transmittance per mm in thickness within a wavelength region of from 200 to 700 nm is at most 20%.

7. The silica glass according to claim 3, wherein the internal transmittance per mm in thickness within a wavelength region of from 200 to 3,000 nm is at most 50%.

8. The silica glass according to claim 7, wherein the internal transmittance per mm in thickness within a wavelength region of from 200 to 3,000 nm is at most 20%.

9. The silica glass according to claim 1, wherein the internal transmittance per mm in thickness within a wavelength region of from 200 to 1,500 nm is at most 90%.

10. The silica glass according to claim 9, wherein the internal transmittance per mm in thickness within a wavelength region of from 200 to 1,500 nm is at most 50%.

11. The silica glass according to claim 10, wherein the internal transmittance per mm in thickness within a wavelength region of from 200 to 1,500 nm is at most 20%.

12. The silica glass according to claim 4, wherein the F content is at least 100 ppm.

13. The silica glass according to claim 12, wherein the F content is at least 2,000 ppm.

14. The silica glass according to claim 13, wherein the F content is at least 5,000 ppm.

15. The silica glass according to claim 1, wherein the mass % of $TiO_2$ is 5 to 9%.

16. The silica glass according to claim 1, further comprising at least one selected from the group consisting of Zr, V, Nb, Cr, Mo, Mn, Fe, Cu and Ce.

17. The silica glass according to claim 4, further comprising at least one selected from the group consisting of Zr, V, Nb, Cr, Mo, Mn, Fe, Cu and Ce.

18. An infrared heating apparatus comprising the silica glass according to claim 1.

19. A cell for optical analysis comprising the silica glass according to claim 1.

20. A base material for an extreme ultraviolet light exposure device comprising the silica glass according to claim 1.

* * * * *